Jan. 31, 1956   L. J. BISHOP   2,732,584
APPARATUS FOR HANDLING ARTICLES OF MANUFACTURE
Filed Nov. 24, 1952   6 Sheets-Sheet 2
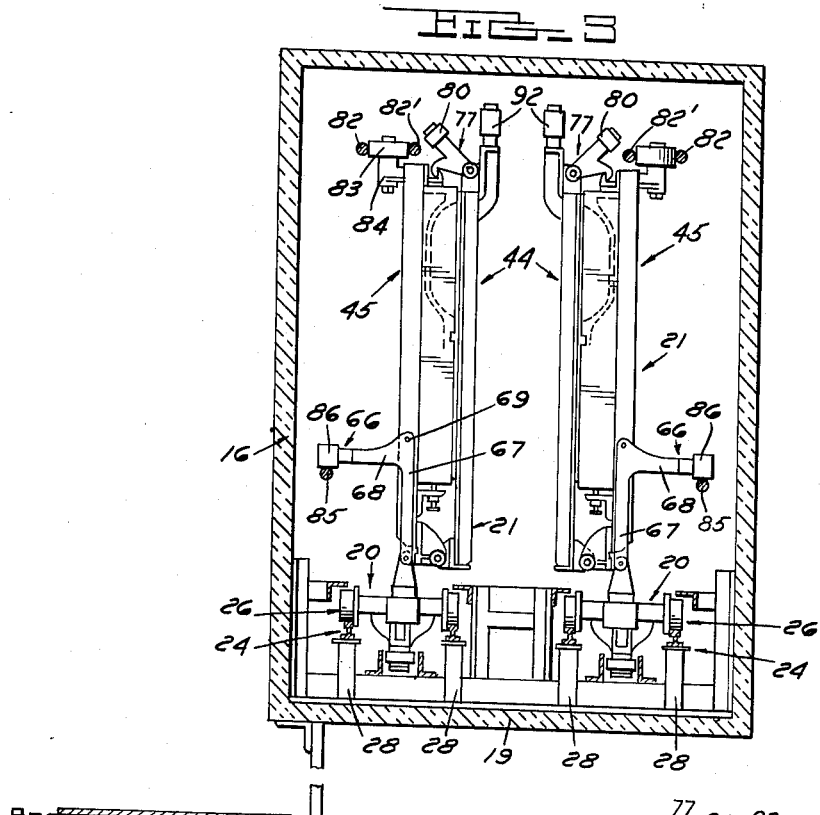
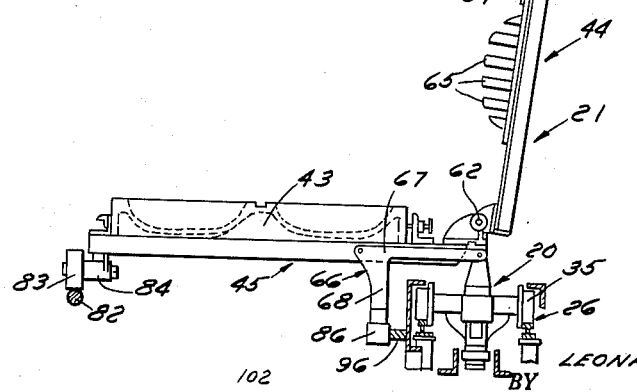
INVENTOR.
LEONARD J. BISHOP
BY Whittemore, Hulbert & Belknap
ATTORNEYS

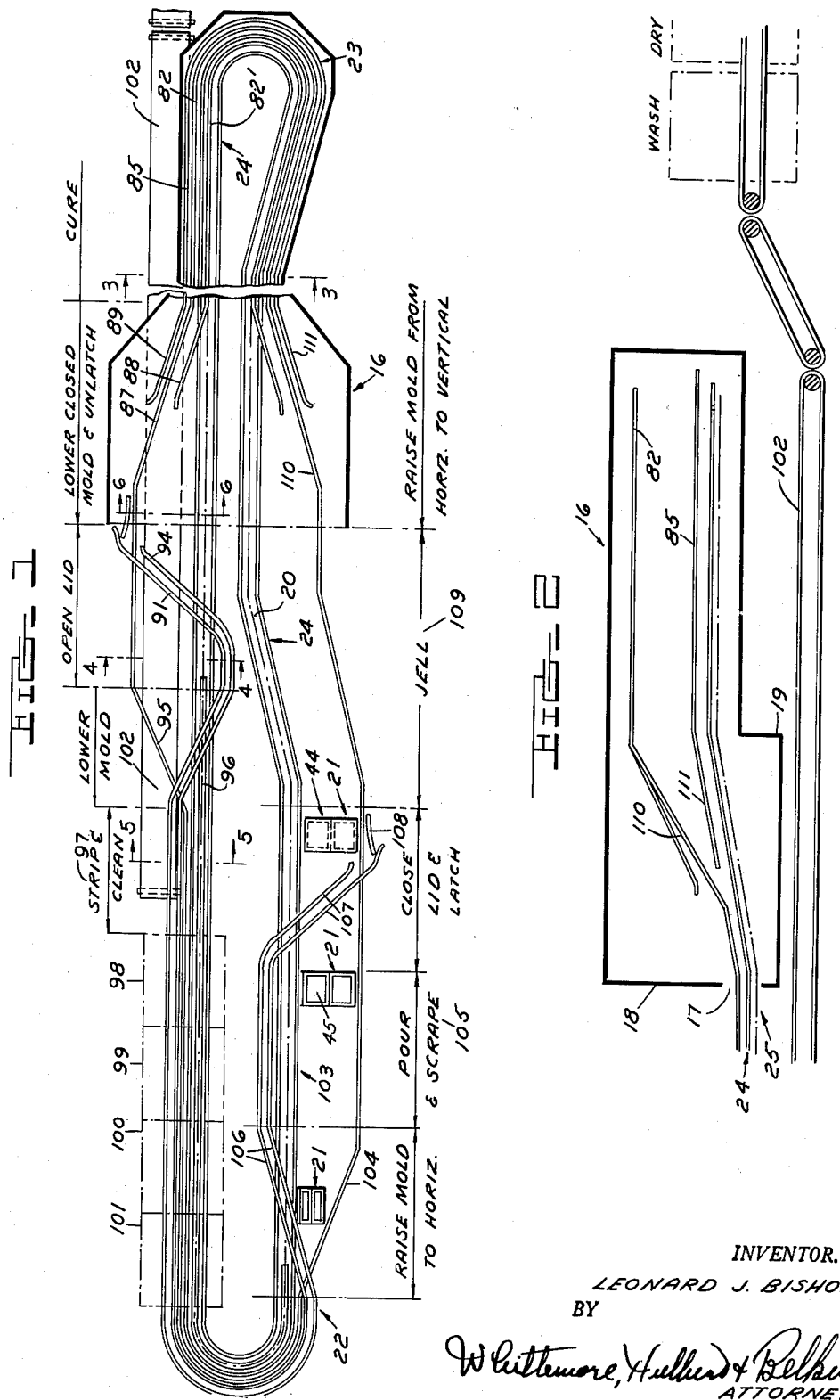

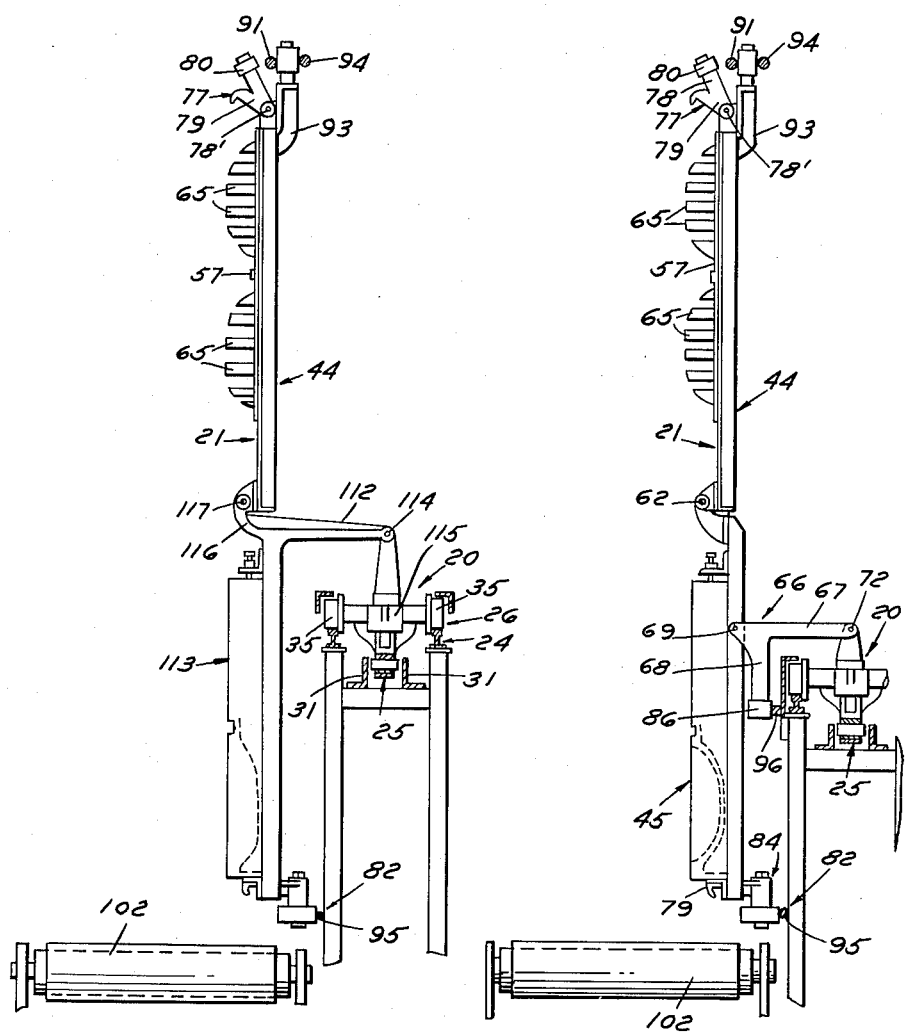

Jan. 31, 1956  L. J. BISHOP  2,732,584
APPARATUS FOR HANDLING ARTICLES OF MANUFACTURE
Filed Nov. 24, 1952  6 Sheets-Sheet 4
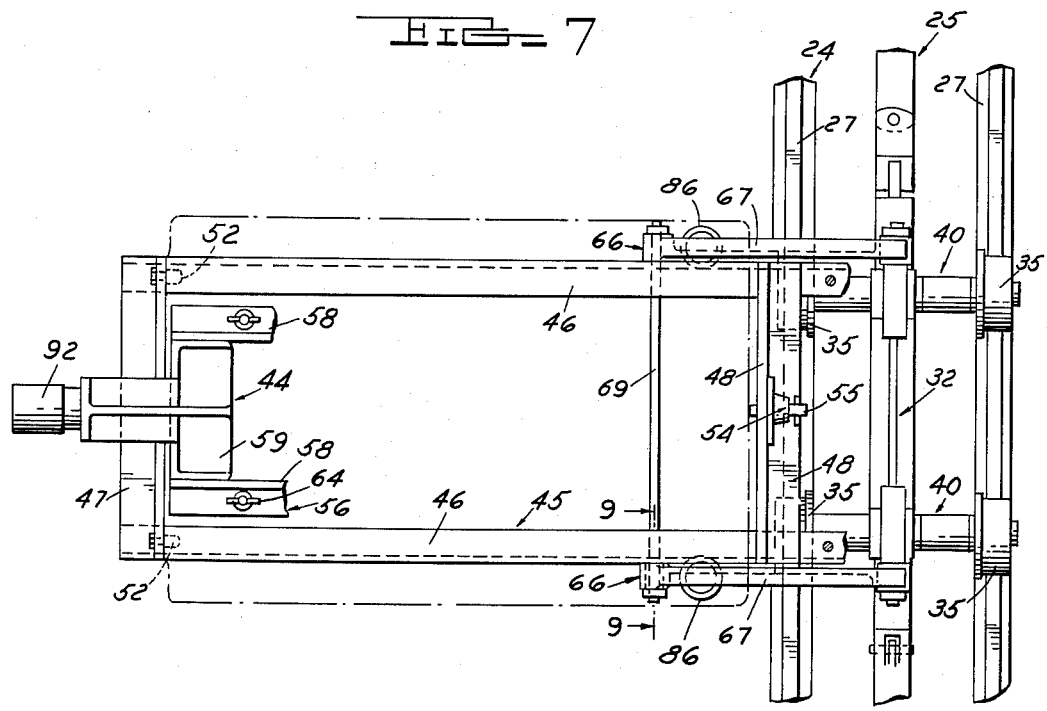
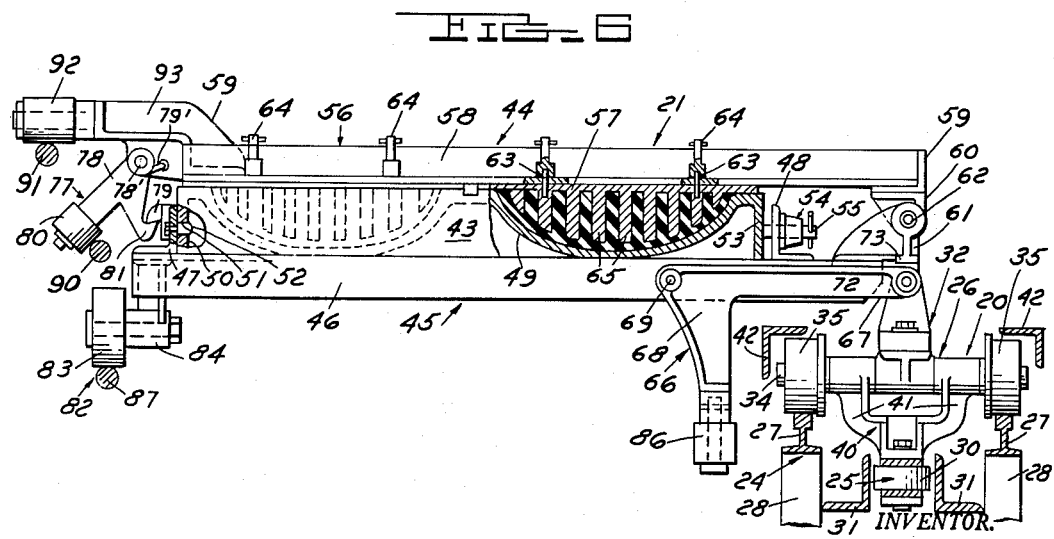
INVENTOR.
LEONARD J. BISHOP
BY
*Whittemore, Hulbert & Belknap*
ATTORNEYS Jan. 31, 1956 L. J. BISHOP 2,732,584
APPARATUS FOR HANDLING ARTICLES OF MANUFACTURE
Filed Nov. 24, 1952 6 Sheets-Sheet 5
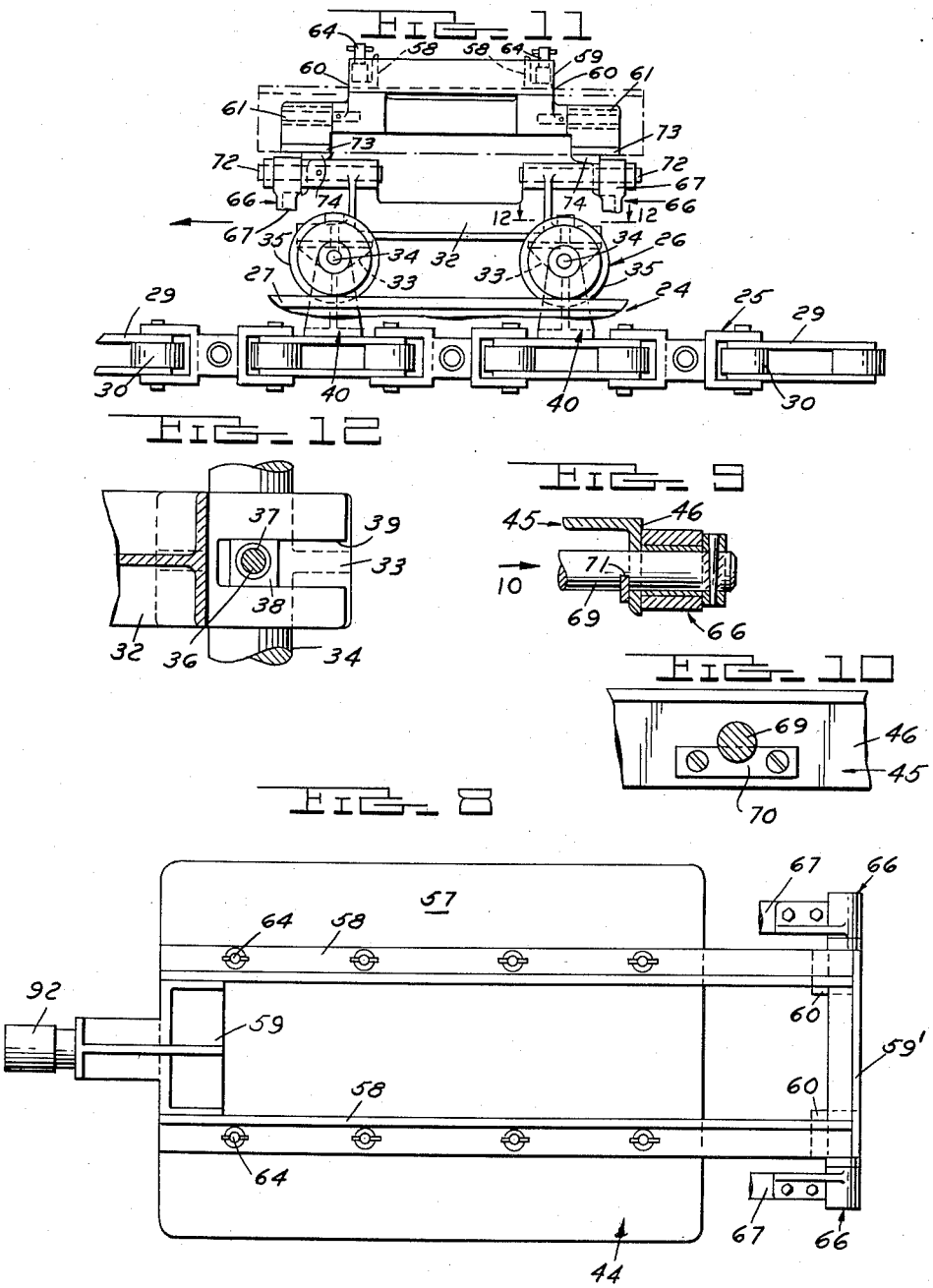
INVENTOR.
LEONARD J. BISHOP
BY
ATTORNEYS

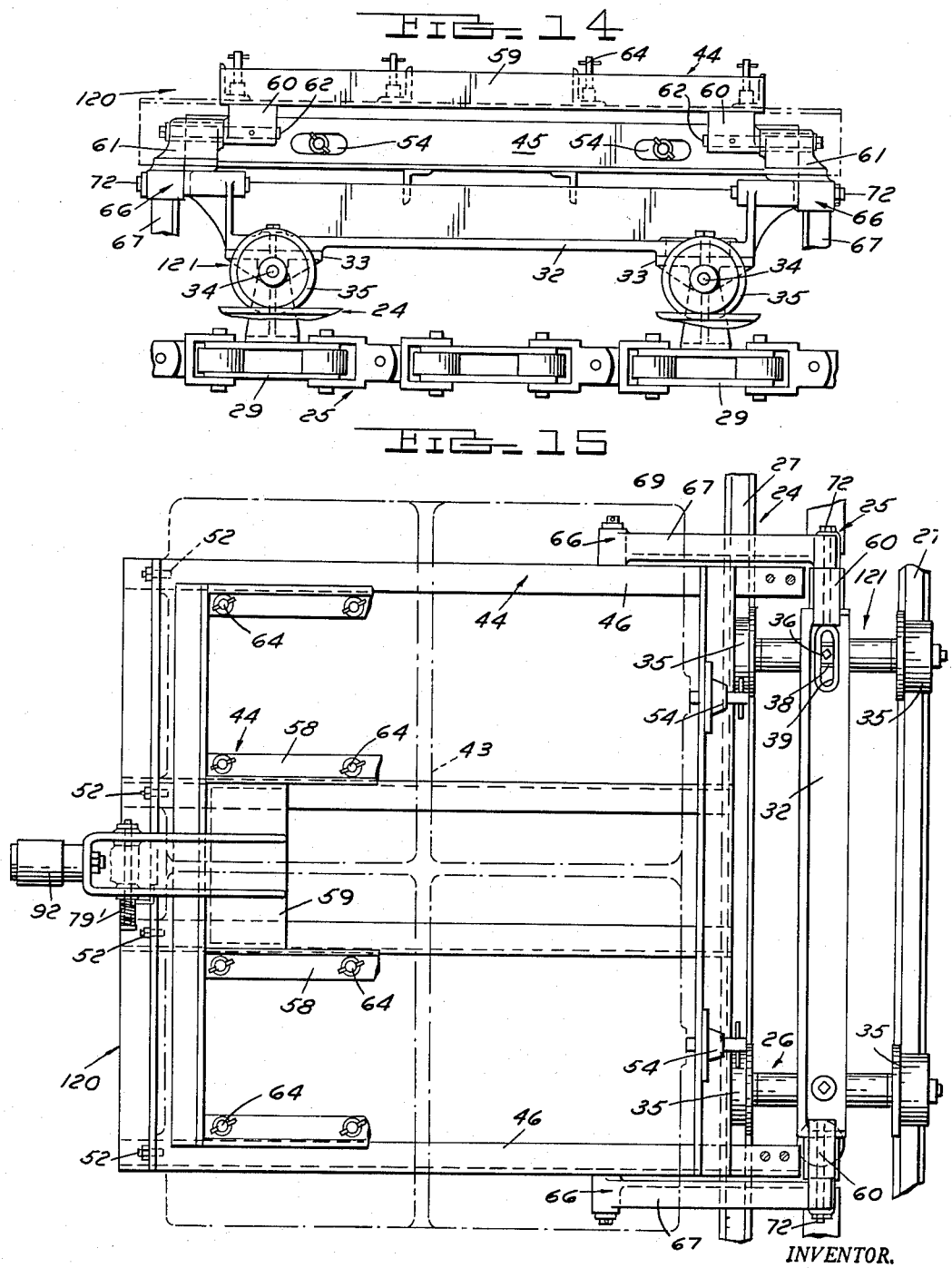

United States Patent Office 2,732,584
Patented Jan. 31, 1956

2,732,584

APPARATUS FOR HANDLING ARTICLES OF MANUFACTURE

Leonard J. Bishop, Birmingham, Mich., assignor to Mechanical Handling Systems, Inc., Detroit, Mich., a corporation of Michigan Application November 24, 1952, Serial No. 322,325

17 Claims. (Cl. 18—4)

This invention relates generally to work handling equipment and refers more particularly to improvements in a conveyor type apparatus embodying a plurality of molds movable continuously throughout an endless path of travel to produce the desired product which may be foam rubber pillows, cushions or other moldable articles.

It is an object of this invention to provide conveyor type apparatus of the above general type which occupies a relatively small area in comparison to its productive capacity and the number of operations performed thereby.

An object of this invention which contributes materially to reducing the overall size of apparatus without reducing its productive capacity is to support a number of mold assemblies on an endless conveyor by pivotal mountings which enable swinging the mold assemblies between upright and horizontal positions during advancement of the conveyor. In accordance with this invention the mold assemblies are held in their upright positions while passing through a curing chamber and while traveling around the arcuate ends of endless path of travel of the conveyor. Thus, the arcuate ends of the conveyor may be of relatively small radii without causing interference between adjacent closely spaced mold assemblies, and the width of the curing chamber may be greatly reduced.

It is another object of this invention to provide means for swinging the bottom and cover or lid sections of the mold assemblies to different relative positions while the assemblies are being advanced by the conveyor. According to this invention the mold assemblies are swung to horizontal positions as they leave the curing chamber and the cover sections are swung upwardly to their open positions. Also the base sections of the assemblies are swung downwardly to depending vertical positions and remain in the latter positions while the molds are stripped and conditioned for the next cycle of operation. The vertical positioning of the bottom and cover sections facilitates the above operations and renders it possible to materially reduce the size of the equipment provided for performing said operations.

The foregoing as well as other objects will be made more apparent as this description proceeds especially when considered in connection with the accompanying drawings wherein:

Figure 1 is a diagrammatic plan view partly broken away showing a conveyor type apparatus embodying the features of this invention;

Figure 2 is a semi-diagrammatic longitudinal sectional view of a part of the structure shown in Figure 1;

Figure 3 is a cross-sectional view taken substantially on the line 3—3 of Figure 1;

Figure 4 is a cross sectional view taken on the line 4—4 of Figure 1;

Figure 5 is a cross sectional view taken on the line 5—5 of Figure 1;

Figure 6 is a cross sectional view taken on the line 6—6 of Figure 1 and having certain parts broken away for the sake of clearness;

Figure 7 is a fragmentary plan view of a part of the conveyor including one of the mold assemblies;

Figure 8 is a fragmentary plan view of a part of one of the mold assemblies;

Figure 9 is a sectional view taken on the line 9—9 of Figure 7;

Figure 10 is a fragmentary elevational view looking in the direction of the arrow 10 in Figure 9;

Figure 11 is a side elevational view of a part of the conveyor apparatus having certain parts broken away for the sake of clearness;

Figure 12 is a sectional view taken on the line 12—12 of Figure 11;

Figure 13 is an end elevational view partly in section showing a modified form of mold assembly;

Figure 14 is a fragmentary side elevational view showing another embodiment of this invention; and Figure 15 is a plan view of the construction shown in Figure 14 and having certain parts broken away for the sake of clearness.

In order to facilitate an understanding of the present invention, the conveyor type apparatus is illustrated herein as especially designed for use in the manufacture of foam rubber pillows, although it will be understood as this description proceeds that many of the features of the apparatus may be advantageously employed in the manufacture of other types of products.

Foam rubber pillows are usually manufactured in half sections and after the latter have been molded to the desired configuration, they are cemented or otherwise secured together to form complete pillows. The apparatus about to be described concerns itself primarily with the production of the half sections of the pillows.

With the above in view reference is made more in detail to the accompanying drawings wherein the numeral 16 indicates a curing chamber heated in any suitable manner not shown herein and having an opening 17 through the inner end wall 18 thereof. As shown in Figure 2 of the drawings, the opening 17 is confined to the portion of the end wall 18 adjacent the bottom wall 19 of the chamber 16 so that the escape of heated gases from the interior of the chamber 16 is reduced to a minimum. The opening 17 is of sufficient size to enable free passage of a conveyor 20 and associated mold assemblies 21 into and out of the curing chamber 16.

The conveyor 20 extends continuously around an endless path of travel 22 (Fig. 1) and one end section 23 of the conveyor is located within the curing chamber 16. The end section 23 of the conveyor 20 within the curing chamber 16 is elevated sufficiently to position the mold assemblies 21 at an elevation above the opening 17 where the temperature within the curing chamber 16 is uniformly high.

The conveyor 20 comprises a track 24, a link type chain 25, and a carriage 26 connected to the chain 25. The track 24 and the chain 25 extend continuously around the path of travel 22, and the chain 25 propels the carriage 26 along the track 23. Although only one carriage 26 is shown in detail herein, it is to be understood that a plurality of such carriages are connected to the chain 25 in proper spaced relationship lengthwise of the chain.

The track 24 comprises laterally spaced rails 27 which are I-shaped in cross section and are mounted on vertical supports 28 in any suitable manner. The chain 25 is positioned midway between the rails 27 and comprises a plurality of pivotally connected links 29 having rollers 30 journalled on the pivots thereof. Suitable angle members 31 are supported between the track rails 27 at opposite sides of the chain 25 and coact with the rollers 30 to guide the chain along the path of travel 22.

As shown in Figures 6 and 11 of the drawings, the carriage 26 comprises a support 32 elongated in the direction of length of the chain 25 and having brackets 33 respectively secured to opposite ends thereof. The brackets 33 are positioned beneath the support 32 and serve as a mounting means for a pair of axles 34 which extend at right angles to the chain 25. Flanged wheels 35 are respectively journalled on opposite ends of the axles 34 and the wheels at opposite sides of the support 32 respectively engage the rails 27 of the track 24. As shown in Figure 12 of the drawings, the bracket 33 at the rear in Figure 12 of the drawings, the bracket 33 at the rear of the support 32 is secured to the support 32 by a stud 36 which extends through a bushing 37 supported in a block 38 and is threaded into the rear bracket 33. The block 38 is slidable within a slot 39 formed in the rear end of the support 32 and elongated in the direction of travel of the carriage 26. The arrangement is such that the rear axle 34 may shift fore and aft relative to the support 32. The purpose of this construction is to enable movement of the carriage to the different elevations of the track 24 and also to permit travel of the carriage around the arcuate ends of the track 24 without causing undue friction or binding of the parts.

The axles 34 are respectively secured to the top of the chain 25 by yokes 40 having the base portions suitably secured to adjacent links 29 of the chain 25 and having the arms 41 respectively journalled on the axles 34 at opposite sides of the support 32. As shown particularly in Figure 6 of the drawings, suitable angle members 42 may be respectively supported above the flanged wheels 35 in order to prevent any possibility of accidental disengagement of the carriage 26 from the track 24.

Referring now to Figures 6–9 inclusive of the drawings, it will be noted that the mold assembly 21 comprises essentially a bottom section 43 and a cover or lid section 44. The bottom section 43 includes a frame 45 having laterally spaced angle members 46 connected at the outer ends by a cross bar in the form of an angle member 47. The inner ends of the angle members 46 are held in proper lateral spaced relationship by a cross bar in the form of an angle member 48 which extends between the angle members 46 and is spaced outwardly from the inner ends thereof.

The bottom section 43 of the mold assembly 21 also includes a part 49 which is contoured in the manner indicated in Figure 6 of the drawings to form two half pillow sections. The outer end of the mold part 49 has a depending flange 50 adapted to abut the inner side of the upstanding flange on the cross bar 47 and having laterally spaced openings 51 therethrough for respectively receiving a pair of locating dowels 52 which extend inwardly from the cross bar 47. The inner end of the mold part 49 has a depending flange 53 spaced laterally outwardly from the cross bar 48 a distance somewhat greater than the length of the locating dowels 52 in order to enable readily locating the part 49 between the cross bars 47 and 48. The mold part 49 is held in a position wherein the locating dowels extend into the openings 51 by a screw type latch 54 secured to the cross bar 48 intermediate the ends thereof and having a manually operable screw 55 for abutting the depending flange 53 on the part 49. It follows from the above that the mold part 49 may be readily assembled with and removed from the frame 45 when desired.

The cover or lid section 44 of the mold assembly 43 comprises a frame 56 and a core plate 57. The frame 56 is shown in Figure 8 of the drawings as comprising laterally spaced angle bars 58 secured together at the outer ends by a bracket 59. The inner ends of the angle bars 58 are connected together by an angle bar 59' and suitable brackets 60 are secured to the underside of the angle bar 59' adjacent opposite ends of the latter. The brackets 60 are respectively pivoted to brackets 61 secured to the inner ends of the angle bars 46 of the bottom frame section 45. The brackets 60 are respectively pivotally connected to the brackets 61 by pins 62 having aligned axes extending in the direction of length of the angle bar 59' in order to permit swinging movement of the cover or lid section 56 to open and closed positions with respect to the bottom section 43. The core plate 57 is removably secured to the underside of the frame 56 by a plurality of studs 63 threaded at spaced points into the plate 57 and arranged to project upwardly through clearance openings formed in the angle bars 58. Suitable wing nuts 64 are threaded on the upper ends of the studs 63 in order to removably clamp the core plate 57 to the angle bars 58. As shown in Figure 6 of the drawings, the core plate 57 is provided with a multiplicity of depending projections 65 positioned to extend into the recesses in the mold part 49 and provide the air spaces usually required in foam rubber pillows or similar products.

The mold assembly 43 previously described is connected to the carriage 20 by a pair of bell cranks 66 respectively positioned at opposite sides of the frame 45 and having arms 67 and 68 extending at substantially right angles to each other. As shown in Figure 6 of the drawings, the bell cranks 66 are pivoted intermediate the arms on a cross shaft 69 which extends through aligned openings formed in the angle bars 46 adjacent the inner ends of the latter. As shown in Figures 9 and 10 of the drawings, the cross shaft 69 is held against axial displacement relative to the frame 45 by a key 70 secured to one of the angle bars 46 at the inner side thereof and projecting into a slot 71 formed in the shaft 69. It follows from the above that the shaft 69 extends parallel to the pivot pins 62 and permits swinging movement of the bell crank 68 relative to the mold assembly 43.

When the mold assembly 21 is in the horizontal position thereof shown in Figure 6 of the drawings the arms 67 of the bell crank levers extend substantially parallel to the angle bars 46 of the frame 45 and project inwardly beyond the inner ends of the latter bars. The inner ends of the arms 67 are respectively pivoted to pins 72 shown in Figure 11 of the drawings as mounted in the support 32 at opposite ends of the latter. The pins 72 extend in axial alignment with each other and are parallel to the axis of the shaft 69. It will also be noted from Figures 6 and 11 of the drawings that the brackets 61 on the frame 45 have pads 73 which are positioned inwardly beyond the inner ends of the angle bars 46 and seat on corresponding pads 74 formed on the support 32 at opposite ends thereof.

Attention is called to the fact at this time that the axes of the pivot pins 62 and 72 lie in a common plane including the path of travel of the chain 25 so that when the mold assembly 21 is swung to its upright position shown in Figure 3 of the drawings it occupies very little space in the direction of width of the track 24. When the mold assembly 21 is in its upright position shown in Figure 3 of the drawings, the lid or cover section 44 is held in its closed position relative to the bottom mold section 45 by a releasable latch mechanism 77 comprising a catch 78 and a keeper 79. The catch 78 is pivoted at one end by a pin 78' to the bracket 59 at the swinging or outer end of the cover section 44 and the keeper 79 is secured to the cross rail 47 at the swinging or outer end of the bottom section 45. The free end of the catch 78 has a roller 80 mounted thereon for reasons to be presently described, and a hook 81 is provided on the catch 78 intermediate the ends for engagement with the keeper 79. A torsion spring 79' is connected to the pivot pin 78' in a manner to urge the catch 78 toward its latching position.

The mold assembly 21 is held in its upright position throughout its travel through the curing chamber 16 by guide rails 82 and 82' suitably supported within the curing chamber 16 adjacent the top of the latter and extending along the path of travel 22. The rails 82 and 82' are spaced laterally from one another to receive therebetween a roller 83 supported on the bottom mold section 45 at the swinging end thereof by a bracket 84. As a precautionary measure to prevent accidental movement of the bottom section 45 of the mold assembly 21 about the pivot shaft 69, a guide rail 85 is suitably supported within the curing chamber 16. The rail 85 extends substantially throughout the length of the chamber 16 and is positioned to engage the under sides of rollers 86 supported on the free ends of the arms 68 of the bell cranks 66.

*Operation*

As shown in Figure 1 of the drawings, the rail 82 has a cam portion 87 positioned at the delivery end of the curing chamber and contoured to swing the mold assembly 21 from its upright position shown in Figure 3 to its horizontal position shown in Figure 6. The rail 82' has a portion 88 adjacent the cam portion 87 and contoured to guide the roller 83 on the mold assembly into engagement with the cam portion 87. The rail 85 previously described as engaged by the rollers 86 on the bell cranks 66 has a cam portion 89 contoured to swing the bell cranks 66 downwardly as a unit with the mold assembly 21 about the aligned axes of the pivot pins 72.

Continued advancement of the mold assembly 21 out of the curing chamber 15 causes the latch roller 80 to engage a cam rail 90 contoured to swing the catch 78 upwardly and thereby release the hook 81 on the catch 78 from the keeper 79. Immediately following release of the latch 77, the cover section 44 is swung to its raised position shown in Figure 4 of the drawings by a cam rail 91 fixed to one side of the path of travel 22 and engageable by a roller 92 secured to the swinging end of the cover section 44 by a bracket 93. A back-up rail 94 is supported in lateral spaced relationship to the cam rail 91 for engagement with the side of the roller 92 opposite the side engaged by the cam rail 91 with the result that the cover section 44 is held in its open position relative to the bottom mold section 45.

After the cover section 21 is raised to its open position shown in Figure 4 of the drawings, the bottom section 45 is swung downwardly about the pivot shaft 69 to the depending upright position shown in Figure 5 of the drawings. Also the rails 91 and 94 are shaped to tilt the cover section 44 forwardly slightly from its fully open position shown in Figure 4 to bring said cover section in a common vertical plane with the bottom section 45. In any case the bottom section 45 is swung downwardly from its horizontal position shown in Figure 6 to its depending upright position shown in Figure 5 by a cam portion 95 on the rail 82. In the latter position of the cover and bottom mold sections the bell cranks 66 are held in their positions shown in Figure 6 by guide rails 96 positioned to engage the inner sides of the rollers 86 on the arms 68 of the bell cranks.

The cover section 44 and the bottom section 45 of the mold assembly 21 are held in the relative positions shown in Figure 5 while the mold assembly is advanced through the stations 97, 98, 99, 100 and 101. At the station 97 the mold is stripped and cleaned. Suitable means not shown is provided at the stations 98, 99, 100 and 101 to respectively water cool, dry, dope spray and again dry the mold. The product stripped from the mold is deposited on a conveyor 102 in the form of a continuous belt which extends along the rear side of the apparatus to suitable product conditioning equipment, not shown.

As the mold assembly 21 leaves the station 101 it travels around the arcuate outer end of the path of travel 22 to the front side 103 of the apparatus. When a reconditioned mold assembly 21 reaches the front side of the apparatus the bottom section 45 is swung upwardly to its horizontal position shown in Figure 6 by a cam portion 104 on the rail 82 and the recesses in the part 43 of the mold are filled at a station 105. As the mold assembly approaches the station 105 the cover section 44 is tilted back to a position corresponding to the one shown in Figure 4 to avoid obstructing access to the bottom mold section 45 and this is accomplished by rearwardly extending portions 106 on the rails 91 and 94.

At the delivery side of the pouring station 105 the rails 91 and 94 are extended forwardly to provide cam portions 107. These cam portions are contoured to coact with the roller 92 on the free end of the cover section 44 to swing the latter downwardly into closed relationship with the bottom section 45. As soon as the cover section 44 is swung to its closed position the latch roller 80 contacts a cam rail 108 which is contoured to swing the catch 78 downwardly into latching engagement with the keeper 79. Thus, the cover section is firmly latched in its closed position.

The mold assembly remains in its horizontal position while being advanced throughout the distance 109 toward the opening 17 in the curing chamber 16 and the time required for the mold assembly to travel the distance 109 is sufficient to cause gelling of the material previously poured into the mold. As the mold assembly enters the curing chamber 16, it is swung upwardly to the position shown in Figure 3 by a cam portion 110 on the rail 82. The bell cranks 66 are also swung upwardly by a cam portion 111 on the rail 85, shown in Figure 1 of the drawings and the cycle of operation is repeated.

The embodiment of the invention shown in Figure 13 illustrates a mold assembly which differs from the one previously described in that the bell cranks 66 are omitted and are replaced by projections 112 extending at right angles from the inner end of the bottom mold section 113 at opposite sides of the latter. The free ends of the projections are pivoted by pins 114 to a support 115 corresponding substantially to the support 32 previously described, and extensions 116 are provided at the opposite ends of the projections for supporting pivot pins 117 for the cover section of the mold assembly. Although this arrangement requires more clearance space between the tracks at opposite sides of the conveyor than the first embodiment, nevertheless, it still occupies considerably less space than structures heretofore available. With the above exceptions, the structure shown in Figure 13 is identical to the embodiment of the invention disclosed in Figures 1 to 12 inclusive and corresponding parts are indicated by the same reference characters.

In the above embodiments of the invention, the mold assemblies are designed to form two pillow or cushion half sections which when secured together form a single pillow or cushion. In Figures 14 and 15 of the drawings I have shown a mold assembly 120 of sufficient size to form four half sections or two complete pillows or cushions. The mold assembly 120 is connected to a carriage 121 which is somewhat larger than the carriage 26 in order to support the larger mold assembly 120. With the exception of size the mold assembly 120 and the carriage 121 is basically the same as the mold assembly 21 and the carriage 26 previously described. Accordingly corresponding parts of the two embodiments of the invention are designated by the same reference characters. It is to be noted, however, that since the mold part 43 is substantially longer than the corresponding part of the mold assembly 21, four longitudinally spaced locating dowels 52 are provided on the bottom mold section 45 for engaging registering openings 51 in the adjacent side of the mold part 43, and two longitudinally spaced releasable clamps 54 are provided instead of the single clamp shown in Figures 6 and 7 of the drawings.

In each of the embodiments of the invention provision is made for supporting the mold assemblies in a vertical upright position relative to the conveyor during the curing phase or, in other words, during the interval the mold assemblies are advanced through the curing chamber 16. Thus a curing chamber 16 of considerably reduced width may be provided in apparatus having a given capacity. Also in each embodiment provision is made for holding the cover and bottom sections of the mold assemblies in vertical extended positions (Figure 5) while the molded product or products are stripped from the mold assemblies and while the mold parts are conditioned for the next cycle. Thus, the foregoing operations are greatly facilitated and the size of the equipment at the reconditioning stations may be materially reduced.

What I claim as my invention is:

1. Apparatus of the class described comprising a conveyor movable along a predetermined path of travel, a mold assembly movable along said path of travel by the conveyor and having a base section and a cover section pivoted for swinging movement to open and closed positions relative to the base section, means pivotally mounting the base section on the conveyor for swinging movement relative to the conveyor about an axis extending in the direction of travel of the conveyor, and means positioned to one side of the conveyor and engageable with the mold assembly for holding said assembly in a vertical position relative to the conveyor.

2. The structure defined in claim 1 comprising cam means extending along the path of travel of the conveyor and engageable with the mold assembly for swinging the latter relative to the conveyor.

3. The structure defined in claim 1 comprising cam means extending along the path of travel of the conveyor and engageable with the mold assembly adjacent the swinging side thereof for swinging said assembly to a horizontal position relative to the conveyor, and cam means positioned to one side of the path of travel of the conveyor and engageable with the cover section for swinging the latter to its open position relative to the base section.

4. Apparatus of the class described comprising a conveyor movable along a predetermined path of travel, a mold assembly movable along the path of travel by the conveyor and having a base section and a cover section at one side of the base section, means pivotally mounting the base section on the conveyor for swinging movement relative to the conveyor about an axis extending in the direction of said path of travel, means positioned to one side of the path of travel of the conveyor and engageable with the mold assembly to hold said assembly in an upright position relative to the conveyor, and means pivotally connecting the cover section adjacent its bottom edge to the base section for swinging movement to open and closed positions relative to the base section.

5. The structure defined in claim 4 having cam means fixed to one side of the path of travel of the conveyor and engageable with the mold assembly for swinging the latter downwardly from its upright position to a substantially horizontal poistion with the cover section at the top of the assembly.

6. The structure defined in claim 5 comprising cam means fixed to one side of the path of travel of the conveyor in a position to engage the cover section in the horizontal position of the assembly and swing said cover section upwardly to its open position.

7. The structure defined in claim 6 having cam means fixed to one side of the path of travel of the conveyor in a position to engage the base section in its horizontal position and swing said base section downwardly.

8. The structure defined in claim 7 comprising a releasable latch for holding the cover section in its closed position relative to the base section, and cam means fixed to one side of the path of travel of the conveyor in a position to engage the latch means and release the latter prior to movement of said cover and base sections from the horizontal positions thereof.

9. Apparatus of the class described comprising a conveyor movable along a predetermined path of travel, a mold assembly movable along the path of travel by the conveyor and having a base section and a cover section at one side of the base section, means pivotally mounting the base section on the conveyor for swinging movement relative to the conveyor about an axis extending in the direction of said path of travel, means positioned to one side of the path of travel of the conveyor and engageable with the mold assembly to hold said assembly in an upright position relative to the conveyor, means pivotally connecting the cover section adjacent its bottom edge to the base section for swinging movement to open and closed positions relative to the base section, and means engageable with the base section and responsive to movement of the mold assembly along said path of travel for swinging the base section of the mold assembly downwardly from its upright position.

10. Apparatus of the class described comprising a conveyor having a part movable along a predetermined path of travel, a mold assembly having a bottom section and a cover section pivotally connected together adjacent one side edge of the assembly to permit swinging movement of the cover section to open and closed positions relative to the bottom section, said mold assembly also having a bell crank pivoted intermediate the ends on the mold assembly and having first and second arms, the first arm of the bell crank extending to a position adjacent said one side edge of the mold assembly and pivoted to said part of the conveyor for swinging movement about an axis extending in the direction of length of the path of travel of the conveyor, and first cam means engageable with the second arm of the bell crank for swinging said bell crank about the axis of pivotal connection of the first arm to said conveyor part.

11. Apparatus of the class described comprising a conveyor movable along a predetermined path of travel, a mold assembly movable along the path of travel by the conveyor and having a base section and a cover section, means pivotally mounting the base section on the conveyor for swinging movement relative to the conveyor about an axis extending in the direction of said path of the travel, means positioned to one side of the path of travel of the conveyor and engageable with the mold assembly to hold said assembly in an upright position relative to the conveyor, means pivotally connecting the cover section adjacent its bottom edge to the base section for swinging movement to open and closed positions relative to the base section, a bell crank pivoted intermediate the ends on the base section and having first and second arms, the first arm of the bell crank extending to a position adjacent the bottom edge of the mold assembly and pivoted to said part of the conveyor for swinging movement about an axis extending in the direction of the path of travel of said part, means respectively engageable with the second arm of the bell crank and with the mold assembly adjacent the top edge of said assembly for swinging both the bell crank and mold assembly downwardly about the axis of the pivotal connection between the first arm of the bell crank and conveyor part to a substantially horizontal position relative to the conveyor, cam means positioned to engage the cover section adjacent its swinging edge in the horizontal position of the mold assembly for swinging the cover section upwardly relative to the base section, and cam means positioned to engage the base section adjacent its swinging edge for swinging said base section downwardly from its horizontal position to a depending vertical position.

12. Apparatus of the class described comprising a conveyor movable along a predetermined path of travel, a mold assembly movable along the path of travel by the conveyor and having a base section and a cover section at one side of the base section, a pivotal connection between the base section and cover section permitting swinging movement of the cover section to open and closed positions relative to the base section, means pivotally mounting the mold assembly on the conveyor for swinging movement about an axis extending in the direction of said path of travel, and means for swinging the mold assembly to a substantially vertical position with respect to the conveyor.

13. The apparatus defined in claim 12 having means for swinging the base section of the mold assembly to a horizontal position with respect to the conveyor.

14. Apparatus of the class described comprising a conveyor movable along a predetermined path of travel, a horizontally disposed mold assembly movable along said path of travel by the conveyor and having a base section and a cover section pivoted to the base section for swinging movement to open and closed positions relative to the base section, means pivotally mounting the base section on the conveyor for swinging movement relative to the conveyor about an axis extending in the direction of travel of the conveyor, cam means extending along said path of travel and engageable with the cover section for swinging the latter to an upright vertical position, and cam means extending along said path of travel and engageable with the base section for swinging the latter to a depending vertical position.

15. Apparatus of the class described comprising a conveyor movable along a predetermined path of travel, a mold assembly movable along the path of travel by the conveyor and having a base section and a cover section at one side of the base section, means pivotally mounting the base section on the conveyor for swinging movement relative to the conveyor about an axis extending in the direction of said path of travel, means positioned to one side of the path of travel of the conveyor and engageable with the mold assembly to hold said assembly in an upright position relative to the conveyor, means pivotally connecting the cover section adjacent its bottom edge to the base section for swinging movement to open and closed positions relative to said base section, and cam means for successively swinging said mold assembly downwardly from its upright position to a substantially horizontal position with the cover section at the top of the mold assembly, swinging said cover section upwardly from its horizontal position to its open position, swinging said base section downwardly from its horizontal position to a depending substantially vertical position, swinging said base section upwardly from its depending position to a horizontal position, swinging said cover section downwardly from its open position to a horizontal closed position relative to said base section, and swinging both mold sections upwardly from the horizontal position thereof to an upright position.

16. The structure defined in claim 15 comprising releasable latch mechanism for securing the cover section in its closed position relative to the base section, means for releasing the latch mechanism prior to swinging the cover section upwardly to its open position, and means for operating the latch mechanism to secure the cover section to the base section prior to swinging the mold assembly upwardly to said upright position.

17. Apparatus of the class described comprising a conveyor movable along a predetermined path of travel, a mold assembly movable along said path of travel by said conveyor and having a base section and a cover section positioned over the top of said base section, means pivotally mounting said mold assembly on said conveyor for swinging movement about an axis extending in the direction of said path of travel, means for swinging said mold assembly about said axis to a substantially vertical position with respect to said conveyor, and means positioned along said path of travel and engageable with said mold assembly to hold the latter in the aforesaid substantially vertical position throughout a substantial portion of the travel of said mold assembly by said conveyor.

References Cited in the file of this patent

UNITED STATES PATENTS

| | | |
|---|---|---|
| 2,027,165 | Grubman | Jan. 7, 1936 |
| 2,103,860 | Mazzeo | Dec. 28, 1937 |
| 2,164,093 | Soubier | June 27, 1939 |
| 2,347,117 | Luxenberger et al. | Apr. 18, 1944 |
| 2,499,399 | Lyons | Mar. 7, 1950 |
| 2,629,130 | Remple | Feb. 24, 1953 |
| 2,629,131 | Martin et al. | Feb. 24, 1953 |